(12) United States Patent
Murthy

(10) Patent No.: US 10,318,752 B2
(45) Date of Patent: Jun. 11, 2019

(54) TECHNIQUES FOR EFFICIENT ACCESS CONTROL IN A DATABASE SYSTEM

(75) Inventor: Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 499 days.

(21) Appl. No.: 11/442,002

(22) Filed: May 26, 2006

(65) Prior Publication Data

US 2007/0276835 A1  Nov. 29, 2007

(51) Int. Cl.
  *G06F 21/62*  (2013.01)
(52) U.S. Cl.
  CPC ................................ *G06F 21/6227* (2013.01)
(58) Field of Classification Search
  None
  See application file for complete search history.

(56) References Cited

U.S. PATENT DOCUMENTS

| | | | |
|---|---|---|---|
| 5,335,346 A | 8/1994 | Fabbio | |
| 5,463,772 A | 10/1995 | Thompson et al. | |
| 5,659,738 A | 8/1997 | Letkeman et al. | |
| 5,864,842 A | 1/1999 | Pederson et al. | |
| 5,924,088 A | 7/1999 | Jakobsson et al. | |
| 5,974,407 A | 10/1999 | Sacks | |
| 6,035,298 A | 3/2000 | McKearney | |
| 6,128,610 A | 10/2000 | Srinivasan et al. | |
| 6,134,549 A | 10/2000 | Regnier et al. | |
| 6,154,741 A * | 11/2000 | Feldman | G06F 9/468 |
| 6,192,476 B1 | 2/2001 | Gong | |
| 6,226,649 B1 | 5/2001 | Bodamer et al. | |
| 6,279,007 B1 | 8/2001 | Uppala | |
| 6,366,902 B1 | 4/2002 | Lyle et al. | |
| 6,381,607 B1 | 4/2002 | Wu et al. | |
| 6,427,123 B1 | 7/2002 | Sedlar | |
| 6,449,609 B1 | 9/2002 | Witkowski | |
| 6,449,652 B1 | 9/2002 | Blumenau et al. | |
| 6,487,552 B1 | 11/2002 | Lei et al. | |
| 6,574,617 B1 * | 6/2003 | Immerman | G06Q 10/10 |
| 6,631,366 B1 | 10/2003 | Nagavamsi et al. | |
| 6,725,212 B2 * | 4/2004 | Couch | G06F 17/30554 |
| 6,757,670 B1 | 6/2004 | Inohara et al. | |
| 6,772,350 B1 | 8/2004 | Belani et al. | |
| 6,785,673 B1 * | 8/2004 | Fernandez | G06F 17/2247 |
| 6,785,721 B1 * | 8/2004 | Immerman | G06Q 10/10 709/220 |
| 6,965,894 B2 | 11/2005 | Leung et al. | |

(Continued)

FOREIGN PATENT DOCUMENTS

WO    WO 00/49533    8/2000

OTHER PUBLICATIONS

Rizvi et al.,—"Extending Query Rewriting techniques for fine-grained access control". (SIGMOD 2004, Jun. 13-18, 2004, 12 pages, ACM.) [As disclose in the Dutta et al. cited prior art in the "Other Publication" section (p. 2) of the Patent].*

(Continued)

*Primary Examiner* — Ashish Thomas
*Assistant Examiner* — Mellissa M. Ohba
(74) *Attorney, Agent, or Firm* — Hickman Palermo Becker Bingham LLP

(57) ABSTRACT

Access control rewrites generate rewritten queries that may be executed more efficiently using index evaluation to determine which rows satisfy one or more access control conditions.

16 Claims, 2 Drawing Sheets

(56) References Cited

U.S. PATENT DOCUMENTS

| | | |
|---|---|---|
| 6,996,557 B1 | 2/2006 | Leung et al. |
| 7,031,956 B1 | 4/2006 | Lee et al. |
| 7,043,488 B1 | 5/2006 | Bauer et al. |
| 7,051,039 B1 * | 5/2006 | Murthy ............... G06F 21/6227 |
| 7,089,239 B1 | 8/2006 | Baer et al. |
| 7,200,595 B2 * | 4/2007 | Dutta et al. ........................ 707/9 |
| 7,366,708 B2 | 4/2008 | Jalali et al. |
| 7,882,132 B2 * | 2/2011 | Ghatare ............ G06F 17/30569 707/782 |
| 7,904,487 B2 * | 3/2011 | Ghatare ............ G06F 17/30427 707/756 |
| 2001/0021929 A1 | 9/2001 | Lin et al. |
| 2002/0073019 A1 | 6/2002 | Deaton |
| 2002/0095421 A1 | 7/2002 | Koskas |
| 2002/0116457 A1 | 8/2002 | Eshleman et al. |
| 2003/0014394 A1 | 1/2003 | Fujiwara et al. |
| 2003/0033285 A1 * | 2/2003 | Jalali et al. ........................ 707/1 |
| 2003/0065659 A1 | 4/2003 | Agarwal et al. |
| 2003/0140308 A1 * | 7/2003 | Murthy ............. G06F 17/30917 715/234 |
| 2003/0200443 A1 * | 10/2003 | Chen ................... G06F 21/6218 713/182 |
| 2004/0064466 A1 * | 4/2004 | Manikutty ........ G06F 17/30917 |
| 2004/0073541 A1 | 4/2004 | Lindblad et al. |
| 2004/0083222 A1 | 4/2004 | Pecherer |
| 2004/0103105 A1 | 5/2004 | Lindblad et al. |
| 2004/0148278 A1 | 7/2004 | Milo et al. |
| 2004/0254948 A1 | 12/2004 | Yao |
| 2004/0267760 A1 | 12/2004 | Brundage et al. |
| 2005/0050046 A1 | 3/2005 | Puz et al. |
| 2005/0091188 A1 | 4/2005 | Pal et al. |
| 2005/0097108 A1 | 5/2005 | Wang et al. |
| 2005/0120031 A1 | 6/2005 | Ishii |
| 2005/0177570 A1 | 8/2005 | Dutta et al. |
| 2005/0228792 A1 | 10/2005 | Chandrasekaran et al. |
| 2005/0229158 A1 | 10/2005 | Thusoo et al. |
| 2005/0289125 A1 | 12/2005 | Liu et al. |
| 2006/0101003 A1 | 5/2006 | Carson et al. |
| 2007/0011167 A1 | 1/2007 | Krishnaprasad et al. |
| 2007/0198545 A1 | 8/2007 | Ge et al. |

OTHER PUBLICATIONS

"Extensible/Rule Based Query Rewrite Optimization in Starburst;" Pirahesh et al.; Association for Computing Machinery, 1992, pp. 39-48.*

European Patent Office, "Communication pursuant for Article 96(2) EPC," App. No. 03783237.5, dated Feb. 1, 2007, 5 pages.

Claims dated Jul. 7, 2006, EP App. No. 03783237.5, 3 pages.

European Patent Office, "Patent Cooperation Treaty", Application No. PCT/US2007/067747, dated Jun. 11, 2008, 6 pages.

Claims, Application No. PCT/US2007/067747, 6 pages.

Garcia-Molina, Hector, et al., "Database System Implementation", Prentice Hall, Department of Computer Science Stanford University, 2000, 27 pages.

U.S. Appl. No. 10/260,381, filed Sep. 27, 2002, dated Jul. 17, 2006.

U.S. Appl. No. 10/944,171, filed Sep. 16, 2004, dated Apr. 19, 2007.

U.S. Appl. No. 11/034,490, filed Jan. 12, 2005, dated Apr. 23, 2007.

U.S. Appl. No. 10/786,941, filed Feb. 24, 2004, dated Aug. 8, 2006.

U.S. Appl. No. 10/763,583, filed Jan. 23, 2004, dated Jul. 25, 2006.

U.S. Appl. No. 10/786,941, filed Feb. 24, 2004, dated Jan. 24, 2007.

U.S. Appl. No. 10/260,381, filed Sep. 27, 2002, dated Feb. 8, 2007.

"Office Action" received in related case U.S. Appl. No. 11/360,792, filed Feb. 22, 2006, 17 pages.

U.S. Appl. No. 10/764,180, filed Jan. 23, 2004, dated Aug. 24, 2006.

Jurgens, Marcus, et al., "PISA: Performance Models for Index Structures with and without Aggregated data", German Research Society, 1999, 7 pages.

Pal, Shankar et al., "Indexing XML Data Stored in a Relational Database", Proceedings of the 30$^{th}$ VLDB Conference, 2004, 12 pages.

* cited by examiner

TECHNIQUES FOR EFFICIENT ACCESS CONTROL IN A DATABASE SYSTEM

RELATED APPLICATIONS

The present application is related to U.S. patent application Ser. No. 09/167,092, entitled Database Fine-Grained Access Control, filed by Chon Hei Lei et al. on Oct. 5, 1998, now U.S. Pat. No. 6,487,552 issued on Nov. 26, 2002, the contents of which are incorporated herein by reference.

The present application is related to U.S. patent application Ser. No. 09/872,896, entitled Virtually Partitioning User Data in a Database System, filed by Christine Pae Guthrie et al. on May 31, 2001, now U.S. Pat. No. 6,587,854 issued on Jul. 1, 2003, the contents of which are incorporated herein by reference.

FIELD OF THE INVENTION

The present invention relates to access control within a database system.

BACKGROUND

There are various mechanisms to control access to data within a database system. One is example is a coarser grained approach that bases accesses privilege at the table level. For example, if a user SCOTT has SELECT privilege on JOE.EMP table, then SCOTT can access all the rows of the table.

A finer grained approach may base access privileges at the row level. One such approach associates an Access Control List ("ACL") at the row-level and uses query rewrite to control access using the row-level association of the ACL. An ACL contains one or more access control entries. Each access control entry grants a set of privileges (e.g. read, write, etc) to a principal, such as a user, user group, or a user role. By associating an ACL with a row, a security policy may be specified at the level of a row.

Under this approach, when a database system receives a query from a user, it rewrites the query (at least logically) to use ACLs to control what may be accessed by the query. Rewriting a query in a way that uses ACLs to control what operations are performed to execute the query, such as accessing or modifying particular rows, is referred to herein as an access control rewrite, or simply rewrite.

In an access control rewrite, the query may be rewritten by appending a predicate that invokes an access control function or operator, to determine whether a user may perform a particular operation on a row. The access control function is implemented to determine whether one or more conditions or criteria, referred to herein as access control conditions, are met. If the access control conditions are met, the user has the necessary privilege to perform the required operation on a particular row, and the access control function returns a result indicating so. The following query QB illustrates an access control rewrite and use of an access control function.

| QB |
|---|
| select * from Emp where Salary > 1000; | is implicitly rewritten to

| QB'Func |
|---|
| select * from Emp where Salary > 1000 AND CHECK_ACL(aclid, "read") = 1. |

The access control function CHECK_ACL takes an ACL identifier (aclid column in this example) and required privileges (e.g. "read") for the query as arguments. The access control function CHECK_ACL evaluates to 1 or 0, depending on whether the ACL of a row grants the required privilege to the current user.

The predicate that includes the CHECK_ACL function is evaluated using functional evaluation. In functional evaluation, each row of a set of rows is examined to determine whether a row satisfies a particular condition. In this case, the CHECK_ACL predicate (i.e. predicate containing the CHECK_ACL function) is evaluated for each row.

However, in many scenarios, queries rewritten in this way perform poorly. Specifically, if other predicates in the queries are unselective and the CHECK_ACL predicate is selective, then the system evaluates CHECK_ACL for many rows but, because the function is selective, CHECK_ACL eliminates most of the rows from the final query results. Thus the relative high I/O cost of accessing many rows is incurred for a result that includes few of them, leading to overall poor performance.

In the current example, for purposes of illustration, table Emp has 1 million rows. The ACLs are set up such that the user issuing query QB has permission to access only 20 rows. There are 100,000 employees matching the Salary predicate, i.e. having Salary>1000 evaluate to true. To compute the query QB'Func, a database system accesses 100,000 rows (perhaps using an index), applies CHECK_ACL function to all of them, but eliminates all but 20 rows from the result. Clearly, this execution strategy suffers from poor performance, and a better approach is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches for access control rewrite that generate rewritten queries that may be executed more efficiently using index evaluation to determine which rows satisfy one or more access control conditions. In an index evaluation, an index is examined to determine which rows satisfy a particular condition. The result of an index evaluation can be the rows (or identity of rows) that satisfy the particular condition e.g. the row ids of the rows that have a key value that satisfy a condition.

An access control rewrite that uses index evaluation to determine which rows satisfy an access control condition is referred to herein as the index evaluation approach to access control rewrite. For example, to compute a rewritten query, an index may be used to determine which rows are associated with some ACL that is relevant to the current user. This approach may access fewer rows and may thus be far more efficient than one that uses only functional evaluation to evaluate access control conditions. An access control rewrite that uses only functional evaluation to evaluate access control conditions is referred to herein as the functional evaluation approach to access control rewrite.

Index evaluation approach may not always be the less costly approach. Described herein are approaches that determine which approach for access control rewrite, the index evaluation approach or functional evaluation approach, is the less costly to use.

Illustrative Data Structures

Figure 1:
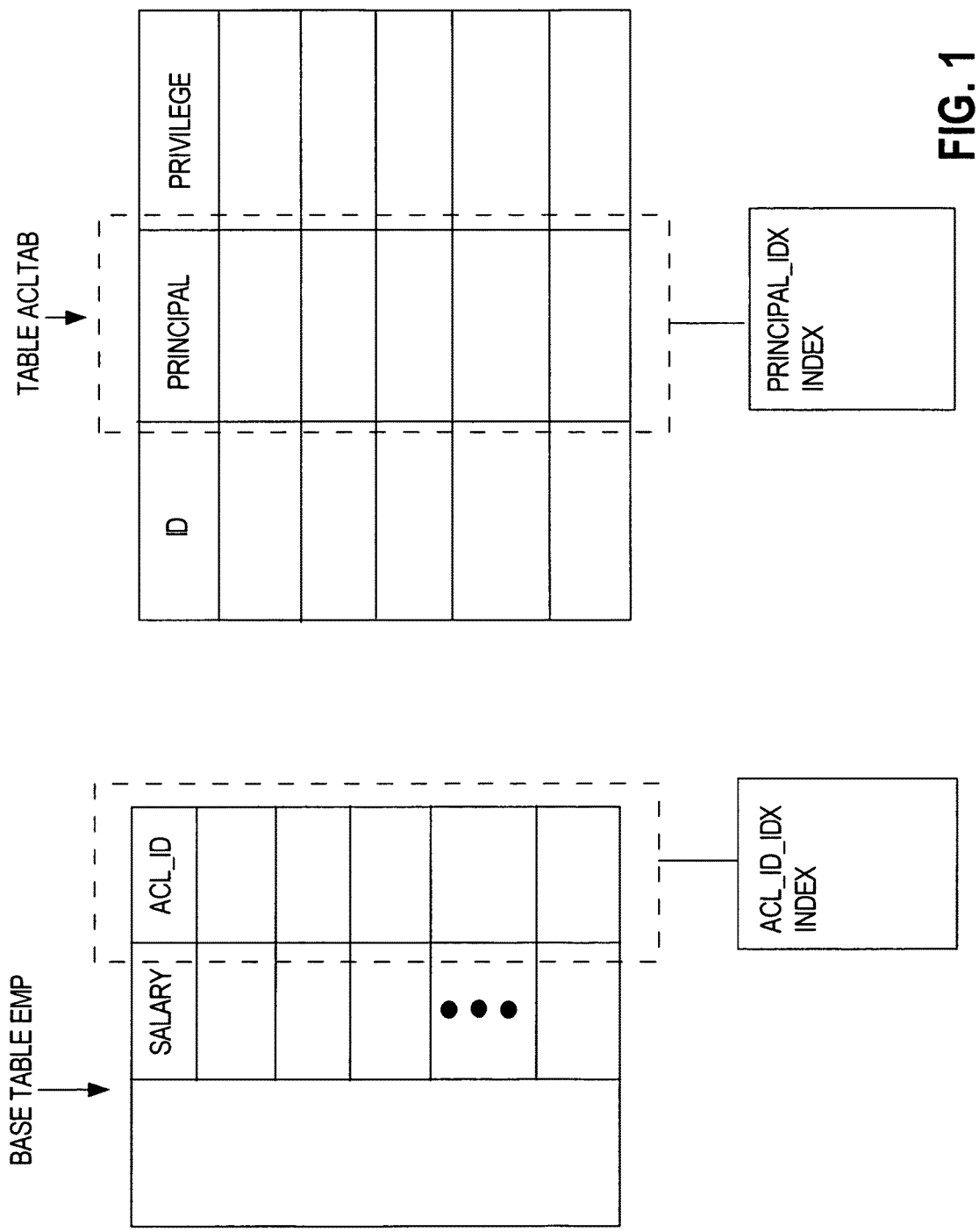
FIG. 1 is a diagram depicting a base table and access control list table used to implement an embodiment of the present invention.

FIG. 1 depicts database structures used to illustrate an embodiment of the present invention. Referring to FIG. 1, it depicts table ACLTAB. Table ACLTAB includes entries (e.g. rows) that each represent an ACL. Column ID stores acl-ids; an acl-id identifies an ACL entry.

Column PRINCIPAL stores a value, referred to as the principal id, which identifies a principal for an ACL entry. A principal is an entity for which an ACL entry defines privileges. An entity may be an individual user (e.g. human user, application, process or computer client), a user group, or a role.

Column PRIVILEGE contains privilege data, which is data that defines one or more privileges. A privilege is a right or power granted or enjoyed by a principal. Examples of privileges include (1) access privileges, such as a right to read or access records, rows, files, XML documents, or a subset of fields or attributes in multiple tables or objects, and (2) right or power to perform actions, such as approving a purchase order in an application or deleting a file or document.

For a row of a given ACL entry in ACLTAB, column ID holds the acl-id for the ACL entry, PRINCIPAL holds a principal id identifying a principal of the ACL, and PRIVILEGE holds privilege data defining one or more privileges of the principal.

Base table EMP is an example of a base data structure for ACLs of ACLTAB. A base data structure, such as base table EMP, is a data structure whose access privileges are defined by one or more ACLs of a body of ACLs. Each row in table EMP is also a base data structure.

Base table EMP includes columns that hold user data. Only one such column, SALARY, is shown in FIG. 1.

Base table EMP also includes column ACL_ID. ACL_ID holds acl-ids. For a particular row in table EMP, the ac-id in ACL_ID associates the row with the ACL identified by the acl-id. User privileges to the row are governed and defined by the ACL associated with the row.

According to an embodiment of the present invention, ACL_ID is a hidden column to which end user access is restricted. For example, any reference to a hidden column in database statement (e.g. query, DDL statement, DML statement) issued by an end user will not be honored by a database system. When a end user issues a command to a database system requesting a list of names of the columns of a table, the names of hidden columns are not returned. Note, however, queries issued by users may be rewritten by a database system to reference hidden columns.

Indexes for Index Evaluation

Index evaluation requires the indexes needed for the evaluation. To this end, base table EMP is indexed by ACL_ID_IDX and ACLTAB is indexed by PRINCIPAL_IDX. The ACL_ID_IDX is column ACL_ID. ACL_I-D_IDX and PRINCIPAL_IDX may be any type of an index, such as a b-tree index or bitmap index, whose entries are ordered by the key values of a key column or key attribute of a body records, such as the acl-ids of column ACL_ID of table EMP. The key for PRINCIPAL_IDX is column ID of ACLTAB.

Structures Maintained by a Database System

According to an embodiment, the structures depicted in FIG. 1 are part of a database managed by a database system. A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Illustrative Access Control Rewrite

As mentioned previously, according to an embodiment of the present invention, in an access control rewrite, a query is rewritten for the index evaluation approach, rather than for the functional evaluation approach. For example, query QB may be rewritten into QB'Idx, as follows.

| QB'Idx |
| --- |
| select * from Emp where Salary > 1000 AND aclid IN (select aclid from ACLTAB where principal in ("SCOTT", "DEV-MGR")); |

To compute QB'Idx, and in particular the subquery in QB'Idx, index evaluation is performed, using index PRINCIPAL_IDX to identify a set of acl-ids of ACL entries associated with the principal that give the principal the privilege required to access a row in EMP. The principal may be, for example, a user role associated with an application that issued query QB or a user associated with a session within which query QB was issued. A principal may include one or more entities.

A set of acl-ids are returned as the result of the sub-query. Because the set of acl-ids identify ACL entries that give the principal the privilege required to access a row, the acl-ids in the set are referred herein as qualifying acl-ids.

Next, index evaluation is used to determine which rows have a matching acl-id in ACL_ID. The index evaluation uses the qualifying acl-ids generated by the subquery to probe index ACL_ID_INDX for entries of rows with a matching acl-id. Only the rows with a matching acl-ids are then accessed to, for example, determine whether the other predicate Salary>1000, is satisfied. Rows that do not match are not accessed.

In the current illustration, the access control condition is assumed to simply be that the principal, user "SCOTT" or user role "DEV-MGR", be a principal of an ACL associated with a row. Thus, the qualifying acl-ids returned by the subquery are simply the acl-ids associated with user SCOTT and user role DEV-MGR.

When there are other access control conditions to evaluate, the subquery would need other predicates to implement logic for the access control conditions. For example, if the access control condition included that a principal have read access for a current period, the predicates in the subquery are used to implement this condition.

Note that functional evaluation may be used to determine which of these ACLs give the user the privileges required for the query. Index evaluation is used to determine which ACLs are associated with a principal, and functional evaluation is used to determine which of these associated ACLs satisfy the other access control conditions. In other words, the index evaluation behaves as the primary filter and provides a superset of ACLs associated with a principal. The functional evaluation can be applied as a secondary filter—but on a smaller subset of the rows from the base table. This demonstrates that an index evaluation approach does not exclude the use of functional evaluation. Functional evaluation may be used to evaluate some of the access control conditions.

Query rewrites are illustrated herein using textual database statements that represent a query and/or rewritten query. Query rewrite may not involve direct rewrite of textual database statements, but may rather involve rewrite of alternate forms of query representation, such as query operator trees or execution plans. An execution plan defines steps for executing a query. An execution plan may define steps for a functional evaluation, steps such as scanning a table and filtering rows scanned based on a predicate condition, or may define steps for index evaluation, such as probing an index to determine which rows are indexed to values that satisfy a condition.

Query Cost Optimization

To determine whether access control rewrite should use the index evaluation approach or the functional evaluation approach, a query optimizer estimates the execution cost of queries executed for either approach and compares them. The rewrite approach with the lowest cost is selected for execution.

To estimate costs, a query optimizer relies on persistently stored cost statistics to estimate the costs of execution plans. Cost statistics are used to estimate important optimizer cost parameters, such as the selectivity of a predicate, which is the fraction or percentage of rows in a table that satisfy a predicate clause. The lesser the fraction or percentage, the more selective the predicate. Examples of cost statistics used to estimate selectivity include table cardinalities (the number of rows in a table), and histograms, which is data that specifies the distribution of values in a column and/or attribute, i.e., the number of rows that have particular column values for a column or the number of rows that have a column value that falls within a range.

To estimate the cost of a query with an access control function, the execution cost of the access control function is determined. There are various factors used to determine the execution costs.

One factor is the average size of an ACL (i.e. amount of data in an ACL, e.g. 1 kb, 10 kb). Cost statistics may indicate the size of structures in a database, such as the size of a table and average size of a row in the table, such as a row containing an ACL. From the cost statistics, the average size of an ACL may be estimated. The average size of an ACL entry indicates the amount of I/O cost incurred to read ACL entries. The greater the average size, the greater the CPU and I/O cost.

To estimate selectivity of the access control function, the number of ACLs associated with the principal is determined. In general, a principal associated with a lower number of ACLs indicates that the access control function is highly selectivity for a query. For example, a query optimizer may consult a histogram to determine that user SCOTT has only a few entries of ACLTAB. Therefore, the selectivity of the access control function is high.

The selectivity estimated for the access control function also indicates the selectivity of the access control criteria. In general, when an access control function or criteria is relatively more selective than other predicates in a query, access control rewrite using the index evaluation approach is less costly as compared to the functional evaluation approach, perhaps less costly in terms of orders of magnitude.

According to an embodiment of the present invention, the access control function is native to the database server's software. Thus, the developers of the database server software know the implementation of access control function and can program the database server's software to determine the execution cost of the access control function.

Alternatively, an access control function may be a user registered function implemented by a user, and may be opaque to a query optimizer. To generate data to estimate query execution costs, the query optimizer may use a cost function registered for the access control function by a user.

Alternative Embodiments

According to an embodiment of the present invention, an ACL entry may be replicated in multiple ACL system tables. A system table is one to which is access from end users is restricted and/or which may be retained in cache so that it may be accessed quickly. One ACL table may serve as a system-wide repository for all (or all of set) of ACL entries, while a subset of ACL entries that pertain to a particular base table are replicated and stored in another smaller ACL table that holds only this subset of entries. As a result, when a query is executed against the particular base table, access control rewrite modifies the query to access the smaller ACL table and the query may be executed faster than one that would have to access the larger system-wide ACL table.

Table ACLTAB is depicted in FIG. 1 as a purely relational table, but structures for storing ACLs are not so limited for embodiments of the present invention. A table for ACLs may be an XML type table, or one or more columns of the table may be XML type columns. XML type is defined by the SQL/XML standard (see INCITS/ISO/IEC 9075-14:2003, which is incorporated herein by reference). An object-relational database system may support XML type as a native built-in data type representing XML values just as any other native data type, such as VARCHAR, the name of an SQL data type representing variable length character values. As a result, an ACL entry and its various attributes (e.g. XML elements and element attributes) may be referenced in rewritten queries using XPath or XQuery constructs, and/or SQL/XML publishing functions, such as XMLElement( ). XPath is described in *XML Path Language (XPath)*, version 1.0 (W3C Recommendation 16 November 1999), which is incorporated herein by reference. XPath 2.0 and XQuery 1.0 are described in XQuery 1.0 and XPath 2.0 Full-Text. (W3C Working Draft 9 Jul. 2004), which is incorporated herein by reference.

Hardware Overview

Figure 2:
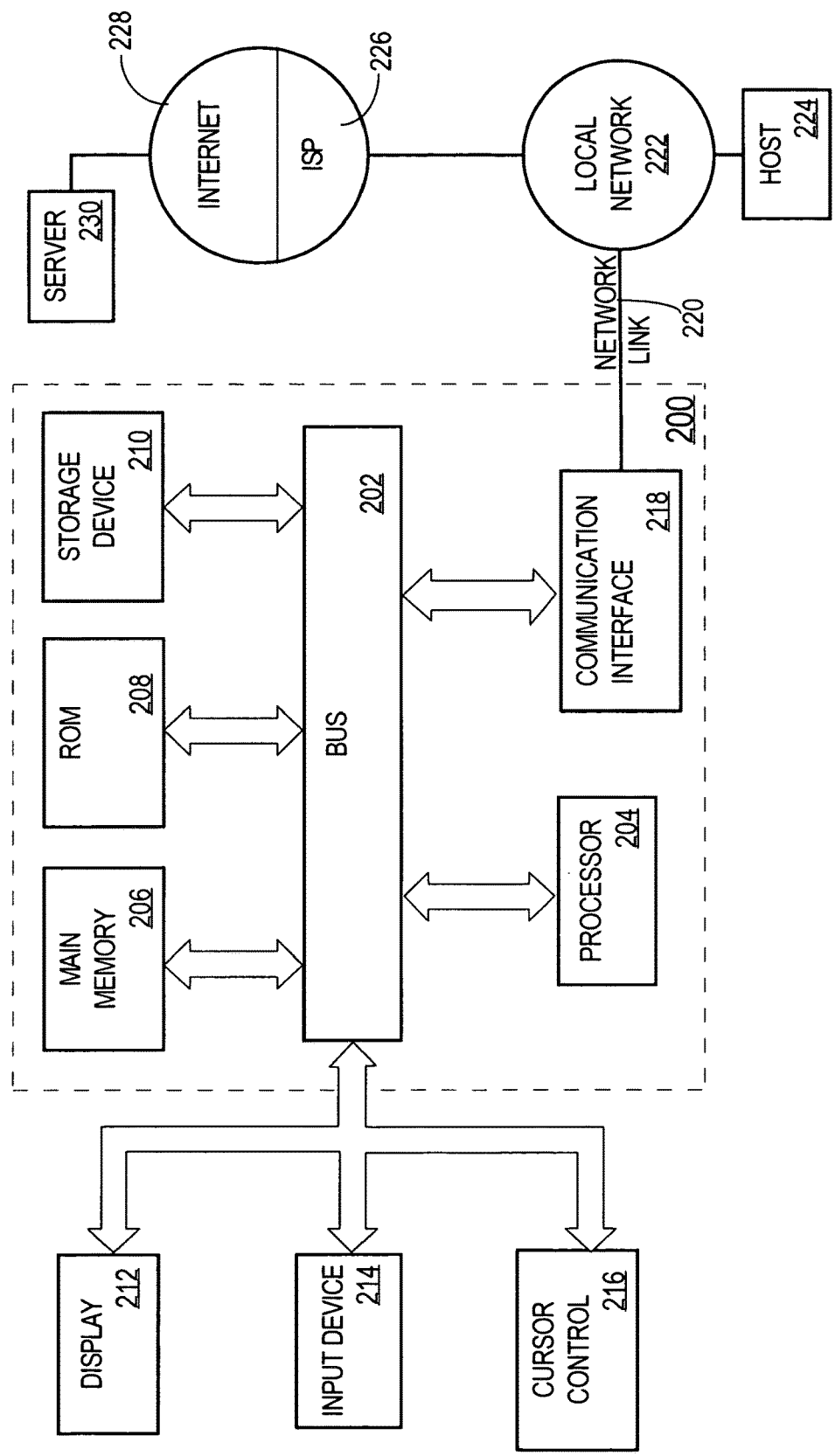
FIG. 2 is a diagram depicting a computer system that may used to implement an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising computer-implemented steps of:
    storing a plurality of ACLs in a first table, said plurality of ACLs being associated with multiple tables, wherein a database managed by a database server includes said first table and said multiple table;
    wherein a subset of said plurality of ACLs are associated with said multiple tables;
    a database server replicating said subset of said plurality of ACLs by at least storing versions of said subset of said plurality of ACLs in a second table different than said first table, said second table not storing versions of other ACLs of said plurality of ACLs that are not in said subset of said plurality of ACLs, wherein said database includes said second table;
    wherein a second index indexes said second table, said second index having an index key based on principals associated with said subset of said plurality of ACLs;
    a database server receiving a request to execute a query for one or more principals;
    wherein said query requires an operation to a base table that belongs to said multiple tables, said operation requiring a privilege to perform, wherein each row of rows in said base table is associated with an ACL of said subset of said plurality of ACLs;
    a database server rewriting said query to generate a first rewritten query to access said second table and that includes a predicate based on a set of one or more ACLs that grant one or more principles said privilege, wherein said predicate causes execution of said first rewritten query to:
        generate said set of one or more ACLs by at least performing an index evaluation on said second index;
        perform an index evaluation based on the predicate to determine which one or more rows in said base table are associated with said set of one or more ACLs, without accessing said one or more rows in the base table to identify said one or more rows, said index evaluation based on the predicate accessing a first index on said base table using said set of one or more ACLs, wherein said first index is ordered by key values of a key of said first index, wherein each key value of said key values identifies an ACL of said plurality of ACLs; and
    wherein the method is performed by one or more computing devices.

2. The method of claim 1, wherein the method further includes:
    rewriting said query to generate a second rewritten query, wherein said rewriting causes, when said second rewritten query is executed, a functional evaluation of certain rows from said base table to determine which of said certain rows satisfy one or more access control criteria for said privilege;
    causing a comparison between a cost for executing said first rewritten query and a cost for executing said second rewritten query; and
    determining whether to execute the first rewritten query based on said comparison.

3. The method of claim 2, wherein said cost for executing said first rewritten query is based on a selectivity of said one or more access control criteria, wherein said selectivity is estimated by determining a proportion of said plurality of ACLs associated with said one or more principals.

4. The method of claim 2, wherein:
    said functional evaluation includes an execution of an access control function that returns a result indicating whether said access control criteria is satisfied; and
    the method further includes invoking a user-registered function that returns information for costs associated with executing said access control function.

5. The method of claim 1, wherein said first table is a database table.

6. The method of claim 5, wherein said plurality of ACLs are stored as data that conforms to XML.

7. The method of claim 6, wherein the method further includes a database server computing queries that reference data in said plurality of ACLs using at least one expression confirming to at least one of XPath or XQuery.

8. The method of claim 1, wherein said base table includes a hidden column that stores an identifier that identifies an ACL associated with a row in said base table.

9. One or more non-transitory storage media storing sequences of instructions which, when executed by one or more computing devices, cause:
   storing a plurality of ACLs in a first table, said plurality of ACLs being associated with multiple tables, wherein a database managed by a database server includes said first table and said multiple tables;
   wherein a subset of said plurality of ACLs are associated with said multiple tables;
   a database server replicating said subset of said plurality of ACLs by at least storing versions of said subset of said plurality of ACLs in a second table different than said first table, said second table not storing versions of other ACLs of said plurality of ACLs that are not in said subset of said plurality of ACLs, wherein said database includes said second table;
   wherein a second index indexes said second table, said second index having an index key based on principals associated with said subset of said plurality of ACLs;
   a database server receiving a request to execute a query for one or more principals;
   wherein said query requires an operation to a base table that belongs to said multiple tables, said operation requiring a privilege to perform, wherein each row of rows in said base table is associated with an ACL of said subset of said plurality of ACLs;
   a database server rewriting said query to generate a first rewritten query to access said second table and that includes a predicate based on a set of one or more ACLs that grant one or more principles said privilege, wherein said predicate causes execution of said first rewritten query to:
      generate said set of one or more ACLs by at least performing an index evaluation on said second index; and
      perform an index evaluation based on the predicate to determine which one or more rows in said base table are associated with said set of one or more ACLs, without accessing said one or more rows in the base table to identify said one or more rows, said index evaluation based on the predicate accessing a first index on said base table using said set of one or more ACLs, wherein said first index is ordered by key values of a key of said first index, wherein each key value of said key values identifies an ACL of said plurality of ACLs.

10. The one or more non-transitory storage media of claim 9, wherein said sequences of instructions include instructions that, when executed by said one or more computing devices, cause:
   rewriting said query to generate a second rewritten query, wherein said rewriting causes, when said second rewritten query is executed, a functional evaluation of certain rows from said base table to determine which of said certain rows satisfy one or more access control criteria for said privilege;
   causing a comparison between a cost for executing said first rewritten query and a cost for executing said second rewritten query; and
   determining whether to execute the first rewritten query based on said comparison.

11. The one or more non-transitory storage media of claim 10, wherein said cost for executing said first rewritten query is based on a selectivity of said one or more access control criteria, wherein said selectivity is estimated by determining a proportion of said plurality of ACLs associated with said one or more principals.

12. The one or more non-transitory storage media of claim 10, wherein:
   said functional evaluation includes an execution of an access control function that returns a result indicating whether said access control criteria is satisfied; and
   said sequences of instructions include instructions, that when executed by said one or more computing devices, cause invoking a user-registered function that returns information for costs associated with executing said access control function.

13. The one or more non-transitory storage media of claim 9, wherein said first table is a database table.

14. The one or more non-transitory storage media of claim 13, wherein said plurality of ACLs are stored as data that conforms to XML.

15. The one or more non-transitory storage media of claim 14, wherein said sequences of instructions include instructions that, when executed by said one or more computing devices, cause a database server computing queries that reference data in said plurality of ACLs using at least one expression confirming to at least one of XPath or XQuery.

16. The one or more non-transitory storage media of claim 9, wherein said base table includes a hidden column that stores an identifier that identifies an ACL associated with a row in said base table.

* * * * *

UNITED STATES PATENT AND TRADEMARK OFFICE
CERTIFICATE OF CORRECTION

PATENT NO. : 10,318,752 B2
APPLICATION NO. : 11/442002
DATED : June 11, 2019
INVENTOR(S) : Murthy Page 1 of 1

It is certified that error appears in the above-identified patent and that said Letters Patent is hereby corrected as shown below:

In the Specification

In Column 3, Line 64, delete "ac-id" and insert -- acl-id --, therefor.

In Column 4, Line 15, after "The" insert -- key for --.

In Column 5, Line 43, delete "acl-ids" and insert -- acl-id --, therefor.

In the Claims

In Column 9, Line 65, in Claim 1, delete "table;" and insert -- tables; --, therefor.

Signed and Sealed this
Twenty-eighth Day of July, 2020

Andrei Iancu
*Director of the United States Patent and Trademark Office*